United States Patent
Park et al.

(10) Patent No.: US 8,209,766 B2
(45) Date of Patent: Jun. 26, 2012

(54) SCANNING PROBE MICROSCOPE CAPABLE OF MEASURING SAMPLES HAVING OVERHANG STRUCTURE

(75) Inventors: Sang-il Park, Seongnam (KR); Sang Han Chung, Seoul (KR); Byoung-Woon Ahn, Cheonan-si (KR)

(73) Assignee: Park Systems Corp., Suwon (KR)

( * ) Notice: Subject to any disclaimer, the term of this patent is extended or adjusted under 35 U.S.C. 154(b) by 324 days.

(21) Appl. No.: 12/705,301

(22) Filed: Feb. 12, 2010

(65) Prior Publication Data

US 2010/0170015 A1    Jul. 1, 2010

Related U.S. Application Data

(63) Continuation-in-part of application No. 12/393,293, filed on Feb. 26, 2009, which is a continuation-in-part of application No. 11/601,144, filed on Nov. 17, 2006, now Pat. No. 7,644,447.

(51) Int. Cl.
*G01N 13/16* (2006.01)
*H01J 37/20* (2006.01)

(52) U.S. Cl. ....... 850/1; 850/3; 850/5; 850/21; 250/310; 73/105; 977/851; 977/872

(58) Field of Classification Search ............. 850/1, 3, 850/5, 21; 250/310; 73/105; 977/851, 872
See application file for complete search history.

(56) References Cited

U.S. PATENT DOCUMENTS

| 5,675,154 A * | 10/1997 | Lindsay et al. ......... 250/442.11 |
| 6,130,427 A * | 10/2000 | Park et al. ................. 850/26 |
| 6,265,718 B1 * | 7/2001 | Park et al. ................. 850/10 |
| 7,644,447 B2 * | 1/2010 | Park et al. ................. 850/1 |

* cited by examiner

*Primary Examiner* — Nikita Wells
(74) *Attorney, Agent, or Firm* — Patterson & Sheridan, LLP

(57) ABSTRACT

A scanning probe microscope tilts the scanning direction of a z-scanner by a precise amount and with high repeatability using a movable assembly that rotates the scanning direction of the z-scanner with respect to the sample plane. The movable assembly is moved along a curved guide by a rack-and-pinion drive system and has grooves that engage with corresponding ceramic balls formed on a stationary frame to precisely position the movable assembly at predefined locations along the curved guide. The grooves are urged against the ceramic balls via a spring force and, prior to movement of the movable assembly, a pneumatic force is applied to overcome the spring force and disengage the grooves from the ceramic balls.

14 Claims, 19 Drawing Sheets

SCANNING PROBE MICROSCOPE CAPABLE OF MEASURING SAMPLES HAVING OVERHANG STRUCTURE

CROSS-REFERENCE TO RELATED APPLICATION(S)

This application is a continuation-in-part of U.S. patent application Ser. No. 12/393,293, filed Feb. 26, 2009, which is a continuation-in-part of U.S. patent application Ser. No. 11/601,144, filed Nov. 17, 2006, now U.S. Pat. No. 7,644,447.

BACKGROUND OF THE INVENTION

Embodiments of the present invention generally relate to a to a scanning probe microscope (SPM), and more particularly, to an SPM which precisely analyzes characteristics of samples having an overhang surface structure.

Scanning probe microscopes (SPMs) have nano-scale resolution in order to show the shape of a surface of a sample or an electrical characteristic of the sample as an image. SPMs include atomic force microscopes (AFMs), magnetic force microscopes (MFMs), and scanning capacitance microscopes (SCMs). SPMs are used to analyze the shape of a surface of a sample or an electrical characteristic of the sample by moving a tip of a probe in contact with the surface of the sample or by moving the tip of the probe at a predetermined distance above the surface of the sample. However, in the case of a conventional scanning probe microscope, there is a problem in that the shape of a surface of a sample or an electrical characteristic of the sample cannot be precisely analyzed on a specific surface shape of the sample.

FIG. 1 is a schematic perspective view of a conventional scanning probe microscope. Referring to FIG. 1, a first scanner 31 and a second scanner 32 are attached to a frame 50. That is, the first scanner 31 is attached to a first frame 51 and the second scanner 32 is attached to a second frame 52. A probe 10 is attached to an end of the first scanner 31 and the first scanner 31 moves the probe 10 in a .+−.z-direction. A stage 20 is provided on the second scanner 32 and the second scanner 32 moves the stage 20 on an xy-plane. When a sample is disposed on the stage 20, the first scanner 31 moves the probe 10 in the .+−.z-direction and the second scanner 32 moves the stage 20, that is, the sample, on the xy-plane so that data related to the shape of a surface of the sample or an electrical characteristic of the sample can be obtained.

FIG. 2A is a schematic conceptual view for the case of analyzing a sample using the scanning probe microscope of FIG. 1. FIG. 2B is a schematic conceptual view of the shape of a surface of the sample obtained by analysis performed in FIG. 2A. FIG. 3A is a schematic conceptual view for the case of analyzing another sample using the scanning probe microscope of FIG. 1. FIG. 3B is a schematic conceptual view of the shape of a surface of the sample obtained by analysis performed in FIG. 3A.

Referring to FIGS. 2A and 2B, while a probe 10 attached to a carrier 15 moves so that a predetermined distance between a tip 12 placed on an end of a cantilever 11 of the probe 10 and the surface of a sample 20 can be kept (or while the tip 12 and the surface of the sample 20 are closely attached to each other), data related to the surface shape of the sample 20 are collected. Actually, while the sample 20 moves in an xy-plane using a second scanner 32 (see FIG. 1) and the probe 10 moves along a z-axis indicated by I1 using a first scanner 31 (see FIG. 1), data related to the sample 20 are collected. As a result, when the surface shape of the sample 20 is realized, the same shape 20' as that of the sample 20 is realized, as illustrated in FIG. 2B.

However, if a sample has an overhang structure illustrated in FIG. 3A, correct data related to the sample cannot be obtained using the conventional scanning probe microscope. That is, while the probe 10 moves along the z-axis indicated by I1 using the first scanner 31 (see FIG. 1), data related to the sample 20 are collected. If a side surface 20a of the sample 20 is not a surface including the z-axis but is an inclined surface illustrated in FIG. 3, the probe 10 cannot scan the side surface 20a of the sample 20 having an overhang structure. Accordingly, when the surface shape of the sample 20 is realized using the conventional scanning probe microscope, there is a problem in that a different shape 20' from that of the sample 20 is realized as illustrated in FIG. 3B.

To solve this problem, a method using a probe 10 illustrated in FIG. 4 has been proposed. That is, the probe 10 has a protrusion 10a on its front end so that correct data related to a sample 20 having an overhang structure can be obtained using the protrusion 10a. However, when using the probe 10, it is not easy to manufacture the probe 10. Excessive costs are required for its manufacture and the yield thereof is also low. In addition, since the probe 10 manufactured in such a way is not sharper than a conventional probe, there is a problem in that precise data related to a fine surface shape of nano-scale cannot be obtained. In the overhang structure of the sample, when the side surface 20a of the sample 20 is more inclined than the protrusion 10a of the probe 10, correct data related to the sample cannot be obtained even using the probe 10 illustrated in FIG. 4.

SUMMARY OF THE INVENTION

One or more embodiments of the present invention provide a scanning probe microscope which precisely analyzes characteristics of samples having an overhang surface structure.

According to an aspect of the present invention, there is provided a scanning probe microscope including: a first probe; a first scanner changing a position of the first probe along a straight line; and a second scanner changing a position of a sample in a plane, wherein the straight line along which the position of the first probe is changed using the first scanner is non-perpendicular to the plane in which the position of the sample is changed using the second scanner.

The scanning probe microscope may further include a second probe, and a third scanner changing a position of the second probe along a different straight line from the straight line along which the position of the first probe is changed, and the straight line along which the position of the second probe is changed using the third scanner may be non-perpendicular to the plane in which the position of the sample is changed using the second scanner.

According to another aspect of the present invention, there is provided a scanning probe microscope including: a first probe; a first scanner changing a position of the first probe along a straight line; a second scanner changing a position of a sample in a plane; and a first actuator changing an angle formed between the straight line along which the position of the first probe is changed using the first scanner and the plane in which the position of the sample is changed using the second scanner.

The first actuator may change an angle formed between the straight line along which the position of the first probe is changed using the first scanner and the plane in which the position of the sample is changed using the second scanner, by moving the first scanner.

The scanning probe microscope may further include a frame supporting the first scanner, and the first actuator may change an angle formed between the straight line along which the position of the first probe is changed using the first scanner and the plane in which the position of the sample is changed using the second scanner, by moving the frame supporting the first scanner.

The scanning probe microscope may further include a second probe, a third scanner changing a position of the second probe along a different straight line from the straight line along which the position of the first probe is changed, and a second actuator changing an angle formed between the straight line along which the position of the second probe is changed using the third scanner and the plane in which the position of the sample is changed using the second scanner.

The first actuator may change an angle formed between the straight line along which the position of the first probe is changed using the first scanner and the plane in which the position of the sample is changed using the second scanner, by moving the first scanner, and the second actuator may change an angle formed between the straight line along which the position of the second probe is changed using the third scanner and the plane in which the position of the sample is changed using the second scanner, by moving the third scanner.

The scanning probe microscope may further include a frame supporting the first scanner and a frame supporting the third scanner, the first actuator may change an angle formed between the straight line along which the position of the first probe is changed using the first scanner and the plane in which the position of the sample is changed using the second scanner, by moving the frame supporting the first scanner, and the second actuator may change an angle formed between the straight line along which the position of the second probe is changed using the third scanner and the plane in which the position of the sample is changed using the second scanner, by moving the frame supporting the third scanner.

The scanning probe microscope may further include a rotating device rotating the first scanner by 180 degrees around an axis which is perpendicular to a plane in which a position of a sample is changed and which passes the first probe, or rotating the position of the sample by 180 degrees in a plane.

Further embodiments of the present invention provide a scanning probe microscope that can tilt the scanning direction of a z-scanner by a precise amount and with high repeatability.

A scanning probe microscope according to one of these further embodiments include a probe, a first scanner for changing a position of the probe along a straight line, and a second scanner for changing a position of a sample in a plane, wherein the first scanner is movable to one of multiple scanning positions, such that, for each of the scanning positions, the straight line along which the first scanner changes the position of the probe forms a different angle with respect to the plane in which the position of the sample is changed using the second scanner.

A scanning probe microscope according to another one of these further embodiments include a probe, a first scanner for changing a position of the probe along a straight line, a second scanner for changing a position of a sample in a plane, and a movable assembly for changing the angle formed between the straight line along which the first scanner changes the position of the probe and the plane in which the position of the sample is changed using the second scanner.

A scanning probe microscope according to another one of these further embodiments include a probe, a first scanner for changing a position of the probe along a straight line, the first scanner being mounted to a movable assembly such that the direction of the straight line with respect to a vertical axis changes as the movable assembly moves into different positions, and a second scanner for changing a position of a sample in a plane.

A positioning system for a probe of a scanning probe microscope, according to an embodiment of the present invention, includes a stationary frame with outer and inner curved guides and projections that are preferably made of ceramic balls, a movable assembly having an inner curved guide engaging member and a probe head including a scanner and grooves for engaging corresponding projections of the stationary frame, and a drive system for the movable assembly including a pinion gear that engages with a rack gear formed along an inner periphery of the outer curved guide. In this system, the scanning direction of the scanner changes as the movable assembly is moved along the inner curved guide.

A method of positioning a probe of a scanning probe microscope, according to an embodiment of the present invention, includes the steps of disengaging the probe from a first kinematic mount, moving the probe to a new position, and locking in the new position via a second kinematic mount, wherein at the new position, the probe is scanned in a direction that is not perpendicular to a sample plane. In order to move the probe to the new position, a pneumatic force may be applied to disengage the probe from the first kinematic mount and allow the probe to be driven to the new position. This pneumatic force is removed during the step of locking in and a spring force causes the locking in of the new position via the second kinematic mount.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown.

Figure 5:
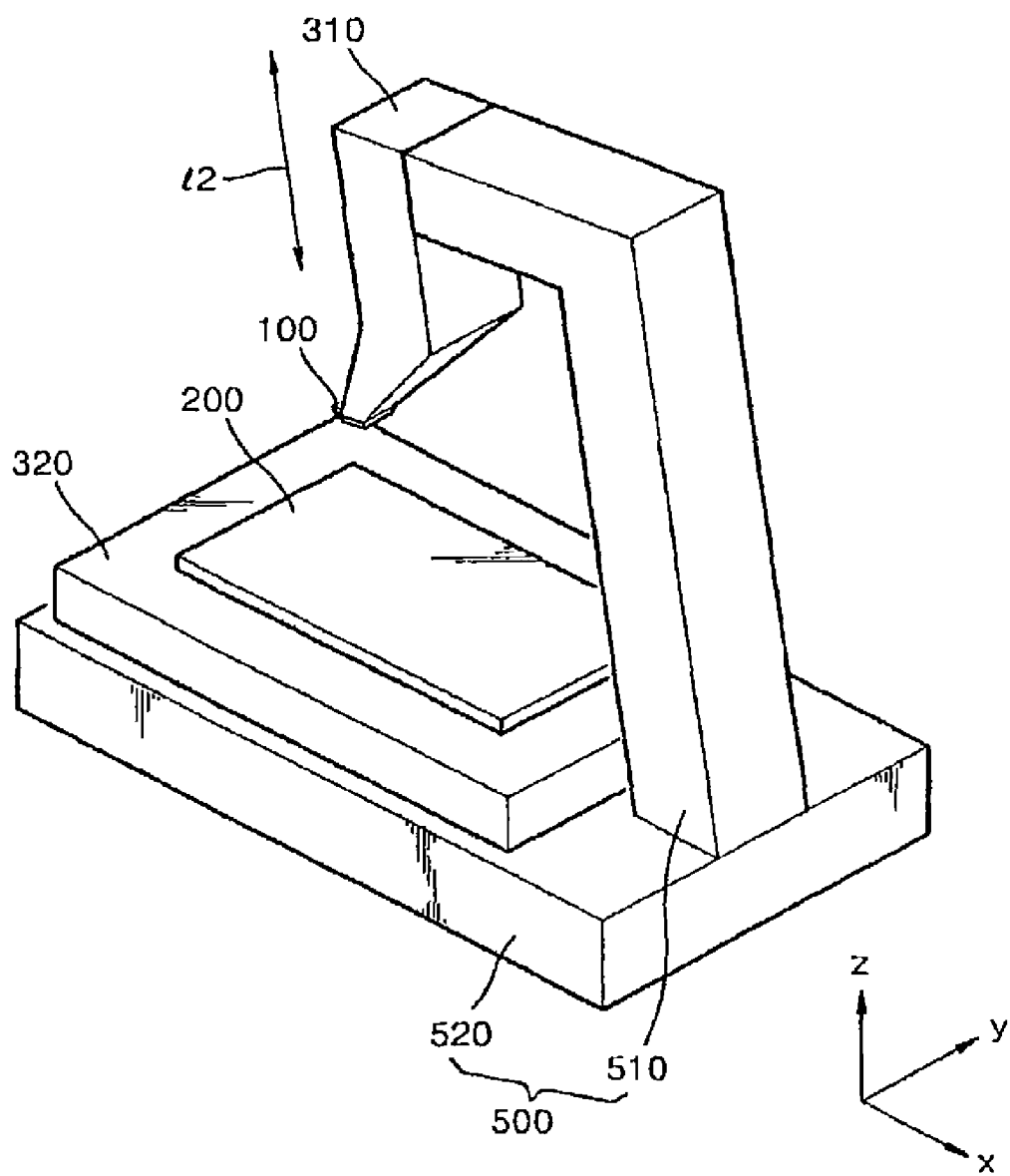
FIG. 5 is a schematic perspective view of a scanning probe microscope according to an embodiment of the present invention.

FIG. 5 is a schematic perspective view of a scanning probe microscope according to an embodiment of the present invention. Referring to FIG. 5, the scanning probe microscope includes a first probe 100, a first scanner 310, and a second scanner 320. Of course, if necessary, the scanning probe microscope may further include a frame 500 having a first frame 510 for supporting the first scanner 310 and a second frame 520 for supporting the second scanner 320, as illustrated in FIG. 5.

Figure 6A:
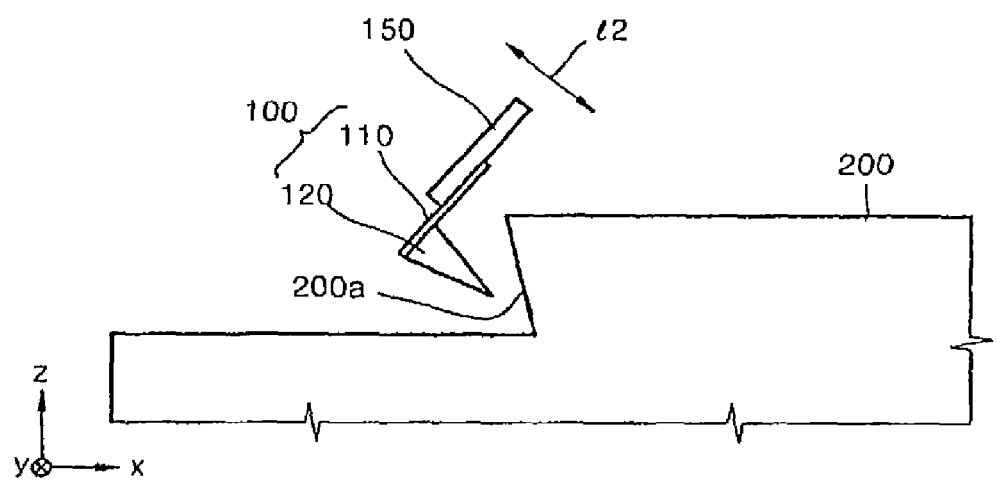
FIGS. 6A, 6B, and 6C are schematic conceptual views for the case of analyzing a sample using the scanning probe microscope of FIG. 5.
Figure 6B:
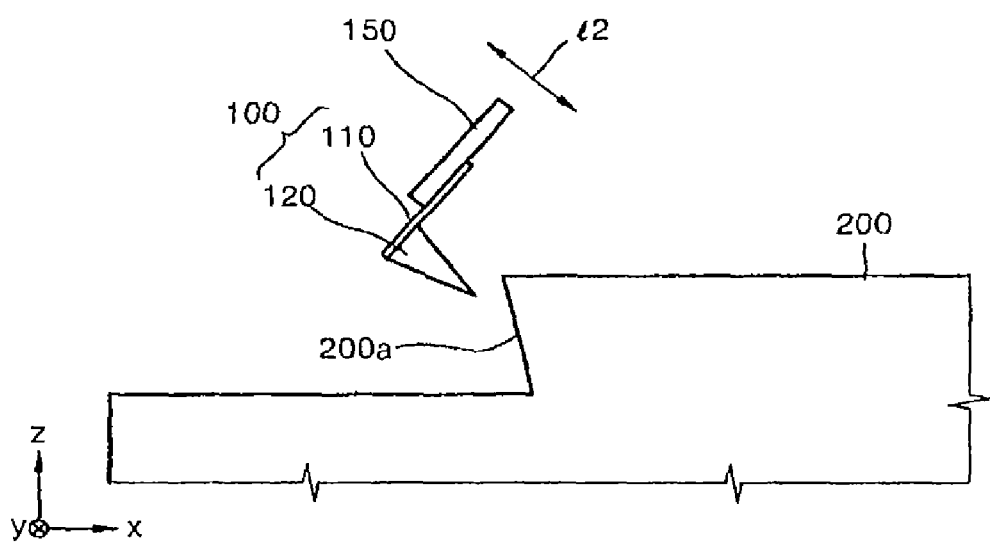

The first scanner 310 changes the position of the first probe 100 along a straight line I2, and the second scanner 320 changes the position of a sample 200 in a plane (an xy-plane). In this case, the straight line I2 in which the position of the first probe 100 is changed using the first scanner 310 is not perpendicular to the plane (the xy-plane) in which the position of the sample 200 is changed using the second scanner 320;

FIGS. 6A and 6B are schematic conceptual views for the case of analyzing a sample using the scanning probe microscope of FIG. 5. As illustrated in FIGS. 6A and 6B, a probe 100 may be attached to a carrier 150 if necessary. While the probe 100 moves so that a predetermined distance between a tip 120 placed on an end of a cantilever 110 of the probe 100 and the surface of a sample 200 can be kept (or while the tip 120 and the surface of the sample 200 are closely attached to each other), data related to the surface shape of the sample 200 are collected. Actually, while the sample 200 moves in an xy-plane using a second scanner 320 (see FIG. 5) and the probe 100 moves along a straight line indicated by I2 using a first scanner 310 (see FIG. 1), data related to the sample 200 are collected.

As described previously, in the case of the scanning probe microscope illustrated in FIG. 5, the straight line I2 in which the position of the first probe 100 is changed using the first scanner 310 is not perpendicular to the plane (the xy-plane) in which the position of the sample 200 is changed using the second scanner 320. Thus, even though the sample 200 has an overhang structure illustrated in FIGS. 6A and 6B, the tip 120 of the probe 100 can precisely scan a side surface 200a of the sample 200 so that data related to the surface of the sample 200 can be precisely collected. In addition, since components including a tip that has been used in the conventional scanning probe microscope can also be used without any changes in the scanning probe microscope illustrated in FIG. 5, a high-performance scanning probe microscope can be manufactured with the same yield as that of the prior art without an increase in manufacturing costs.

Figure 6C:
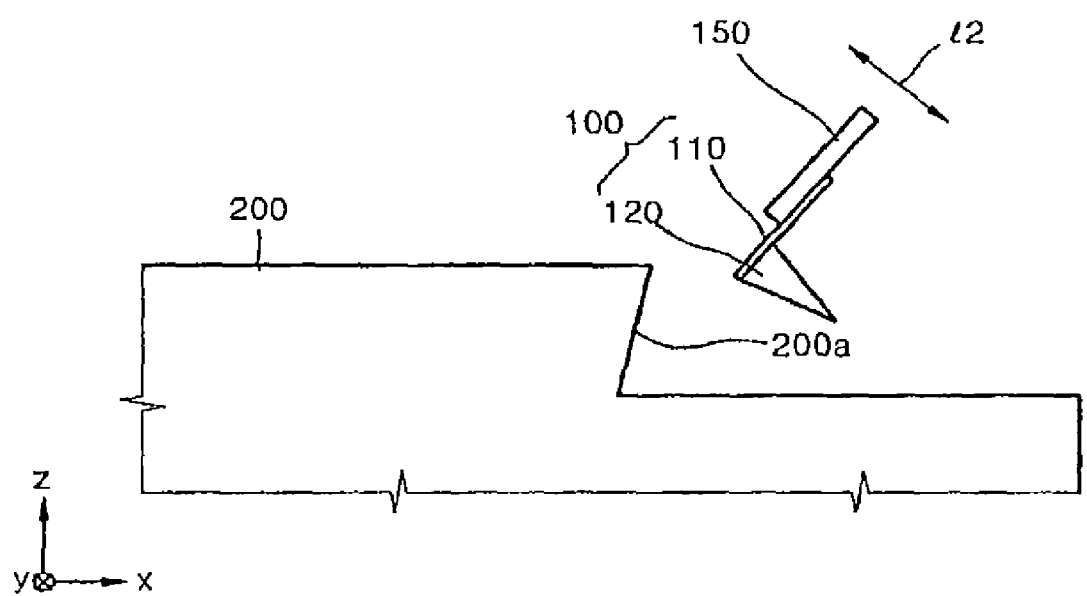

When data related to a sample are obtained using the scanning probe microscope illustrated in FIG. 5, with respect to the sample 200 having an overhang shape which is opposite to the overhang shape of the sample illustrated in FIGS. 6A and 6B and in which only a sample is rotated by 180 degrees in an xy-plane, as illustrated in FIG. 6C (not the sample 200 having an overhang shape illustrated in FIGS. 6A and 6B), the overhang-shaped side surface 200a of the sample 200 may not be precisely scanned. Thus, to solve the problem, the scanning probe microscope illustrated in FIG. 5 may further include a rotating device for rotating the sample 200 by 180 degrees within the xy-plane. By rotating the sample 200 illustrated in FIG. 6C using the rotating device, the overhang structure of the sample 200 may be placed with respect to the straight line I2 in which the position of the probe 100 is changed using the first scanner 310, as illustrated in FIG. 6A or 6B. Of course, a variety of modifications like that the rotating device may also rotate the first scanner 310, are possible. That is, the rotating device may also rotate the first scanner by 180 degrees around an axis which is perpendicular to the plane (the xy-plane) where the position of the sample is changed and which passes the probe 100. In addition, this configuration may also be applied to the scanning probe microscope according to another embodiments which will be described later, as well as the scanning probe microscope illustrated in FIG. 5.

Figure 7:
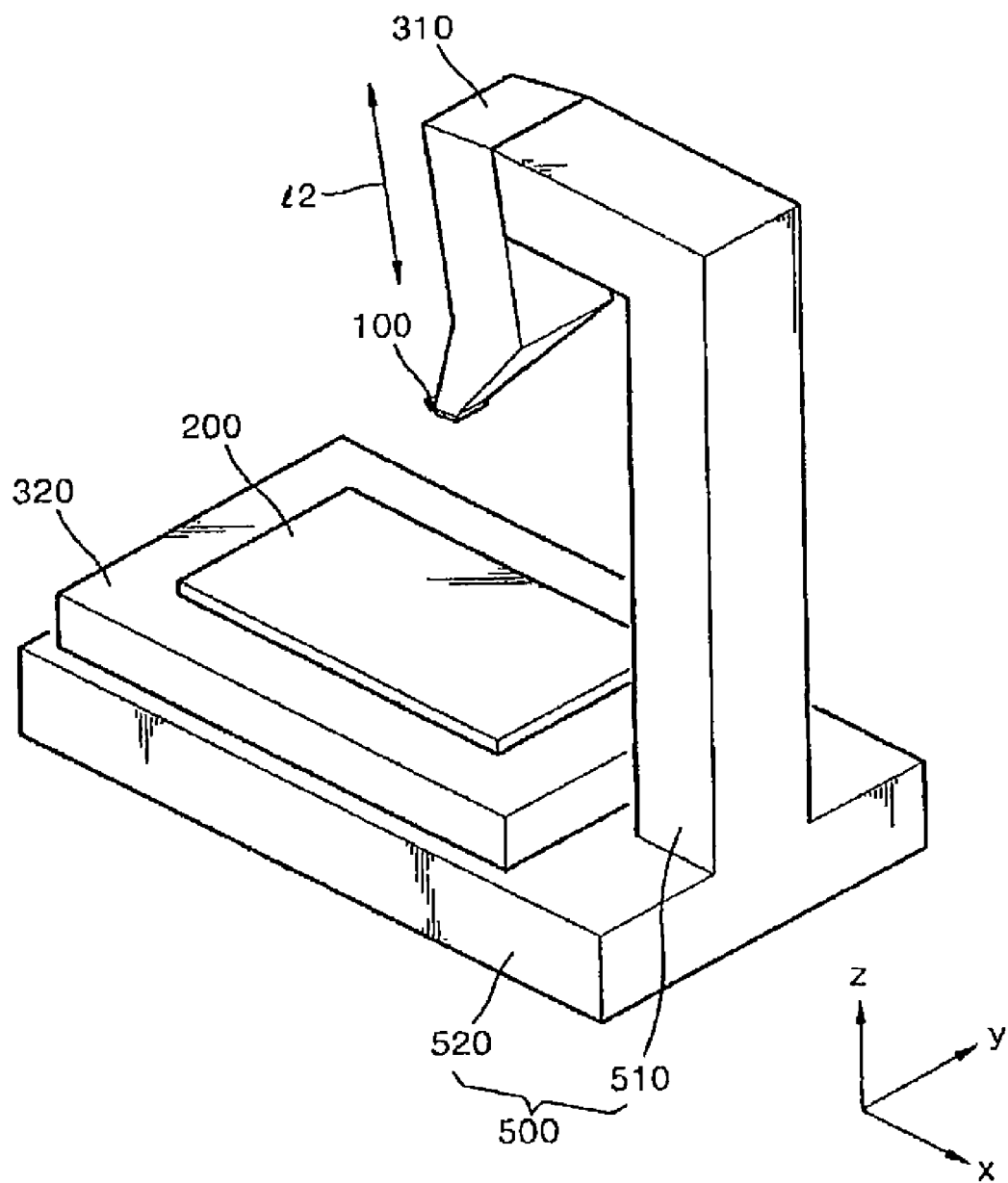
FIG. 7 is a schematic perspective view of a scanning probe microscope according to another embodiment of the present invention.

In the scanning probe microscope illustrated in FIG. 5, the first frame 510 for supporting the first scanner 310 is inclined so that the straight line I2 in which the position of the first probe 100 is changed using the first scanner 310 can be non-perpendicular to the plane (the xy-plane) in which the position of the sample 200 is changed using the second scanner 320. However, various modifications that are different from the scanning probe microscope illustrated in FIG. 5 are possible. For example, like a scanning probe microscope illustrated in FIG. 7 according to another embodiment of the present invention, the first scanner 310 itself is non-perpendicular to the plane (the xy-plane) in which the position of the sample 200 is changed using the second scanner 320 so that the straight line I2 in which the position of the first probe 100 is changed using the first scanner 310 can also be non-perpendicular to the plane (the xy-plane) in which the position of the sample 200 is changed using the second scanner 320.

Meanwhile, an angle formed between the plane (the xy-plane) in which the position of the sample is changed using the second scanner and the side surface of the sample having the overhang structure may be different according to samples. In this case, in order to obtain correct data related to the sample in the overhang structure of the sample, an angle formed between the straight line along which the position of the first probe is changed using the first scanner and the plane (the xy-plane) in which the position of the sample is changed using the second scanner needs to be properly adjusted according to the overhang structure of the sample. Thus, like a scanning probe microscope illustrated in FIG. 8 according to another embodiment of the present invention, the scanning probe microscope may further include a first actuator 410. The first actuator 410 serves to change an angle formed between the straight line I2 in which the position of the first probe 100 is changed using the first scanner 310 and the plane (the xy-plane) in which the position of the sample 200 is changed using the second scanner 320.

Figure 8:
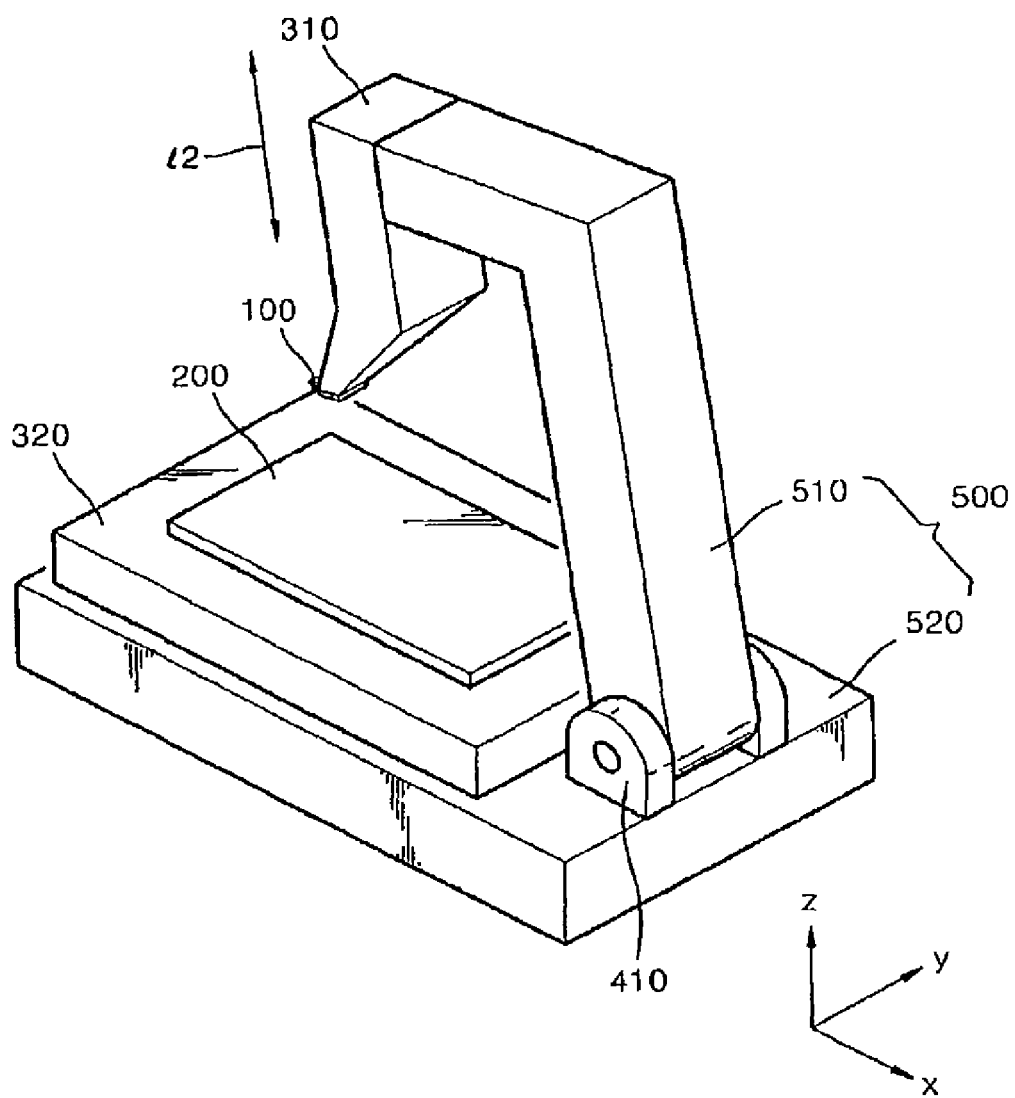
FIG. 8 is a schematic perspective view of a scanning probe microscope according to another embodiment of the present invention.
Figure 9:
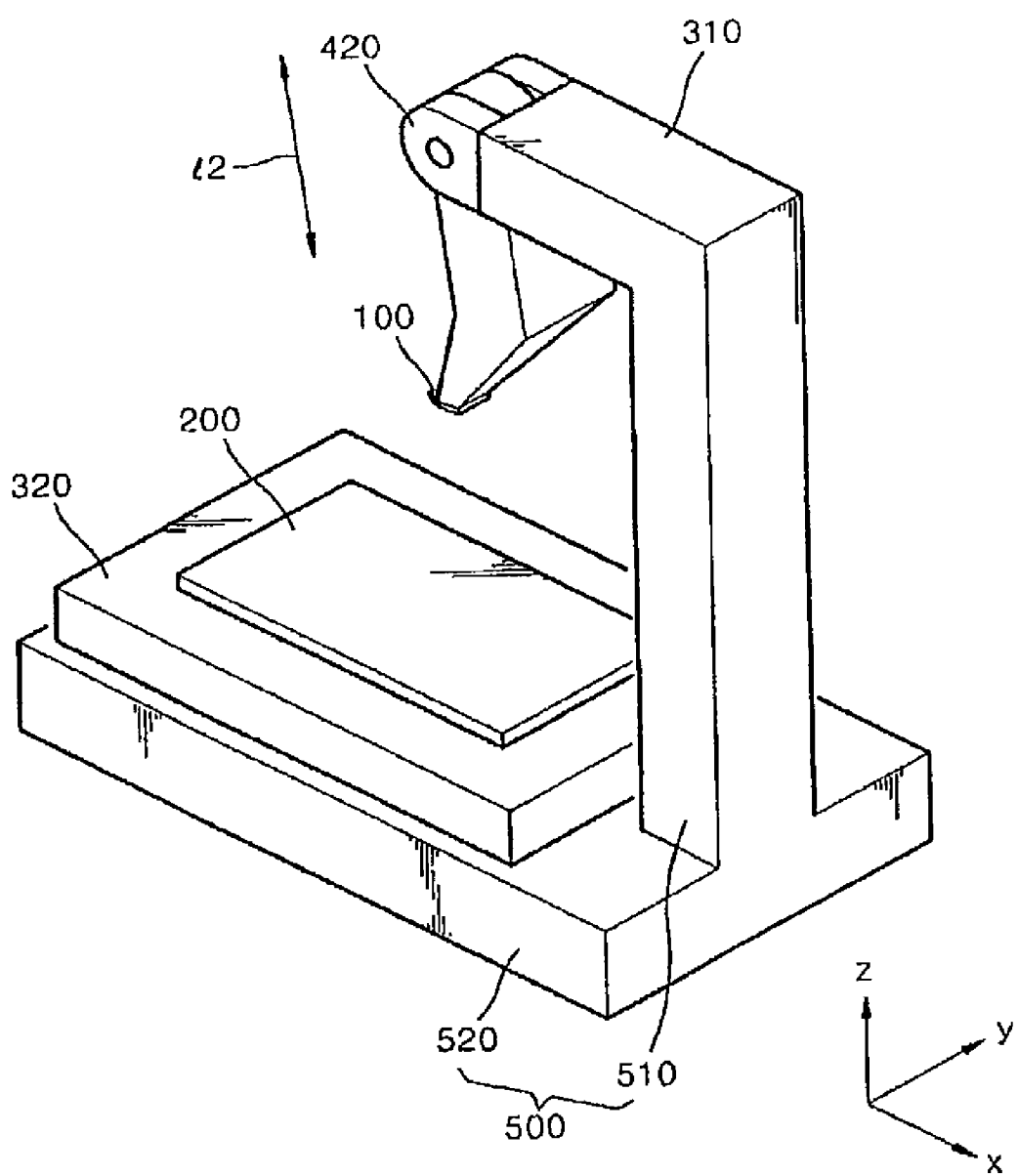
FIG. 9 is a schematic perspective view of a scanning probe microscope according to another embodiment of the present invention.

In the case of the scanning probe microscope illustrated in FIG. 8, the first actuator 410 moves the first frame 510 for supporting the first scanner 310 so that an angle formed between the straight line I2 in which the position of the first probe 100 is changed using the first scanner 310 and the plane (the xy-plane) in which the position of the sample 200 is changed using the second scanner 320, canoe changed. However, various modifications that are different from the scanning probe microscope of FIG. 8 are possible. For example, like a scanning probe microscope illustrated in FIG. 9 according to another embodiment of the present invention, the first actuator 410 moves the first scanner 310 so that an angle formed between the straight line I2 in which the position of the first probe 100 is changed using the first scanner 310 and the plane (the xy-plane) in which the position of the sample 200 is changed using the second scanner 320 can also be changed.

Figure 1:
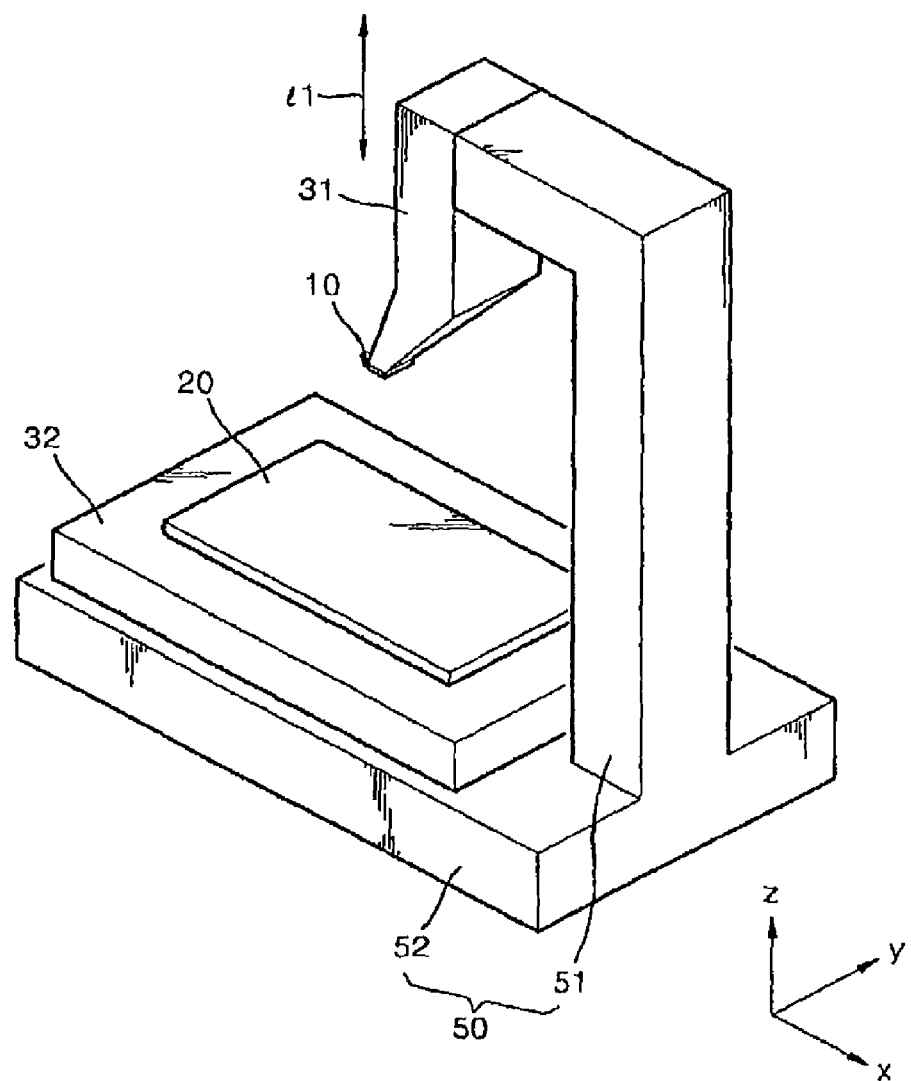
FIG. 1 is a schematic perspective view of a conventional scanning probe microscope.
Figure 2A:
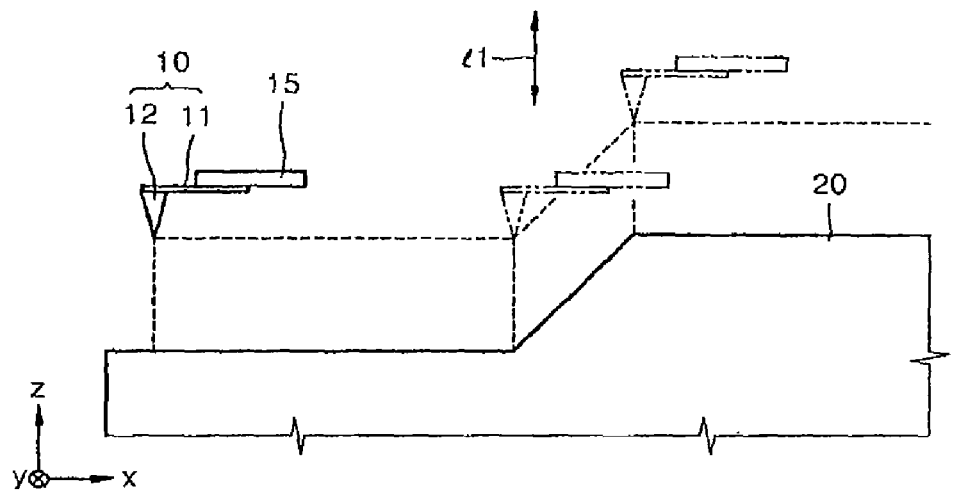
FIG. 2A is a schematic conceptual view for the case of analyzing a sample using the scanning probe microscope of FIG. 1.
Figure 2B:
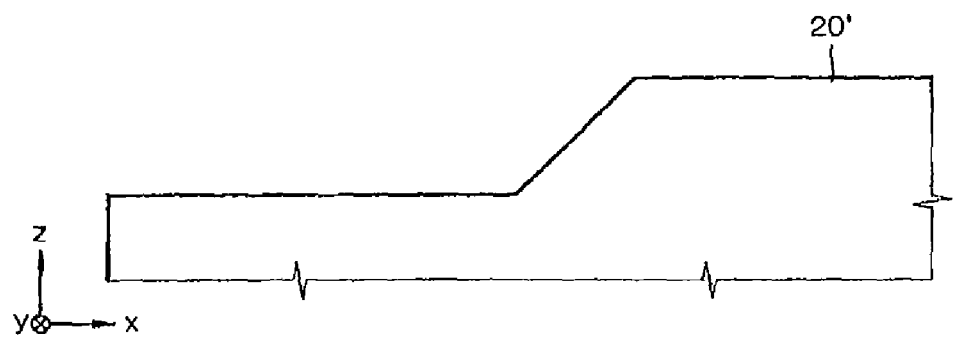
FIG. 2B is a schematic conceptual view of the shape of a surface of the sample obtained by analysis performed in FIG. 2A.
Figure 3A:
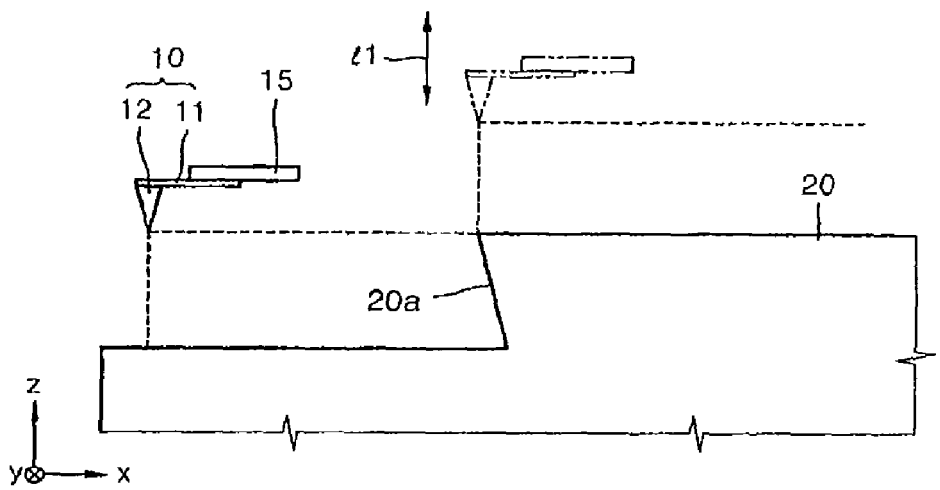
FIG. 3A is a schematic conceptual view for the case of analyzing another sample using the scanning probe microscope of FIG. 1.
Figure 3B:
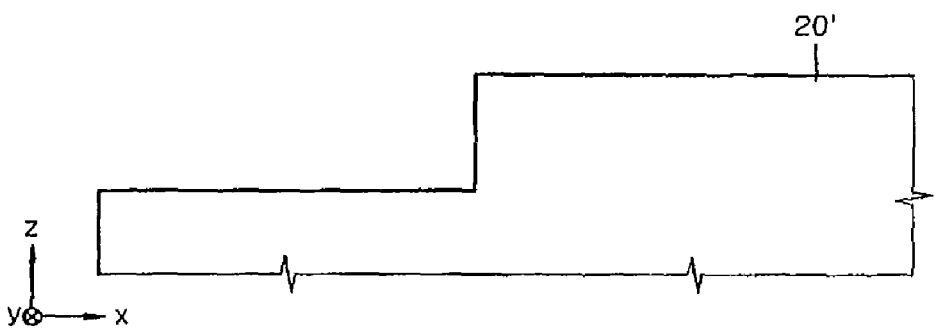
FIG. 3B is a schematic conceptual view of the shape of a surface of the sample obtained by analysis performed in FIG. 3A.
Figure 4:
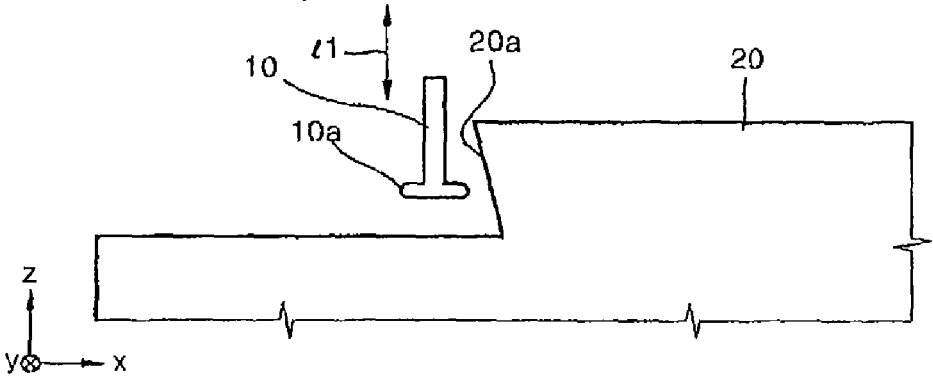
FIG. 4 is a schematic conceptual view for the case of analyzing a surface shape of a sample using another conventional scanning probe microscope.
Figure 10A:
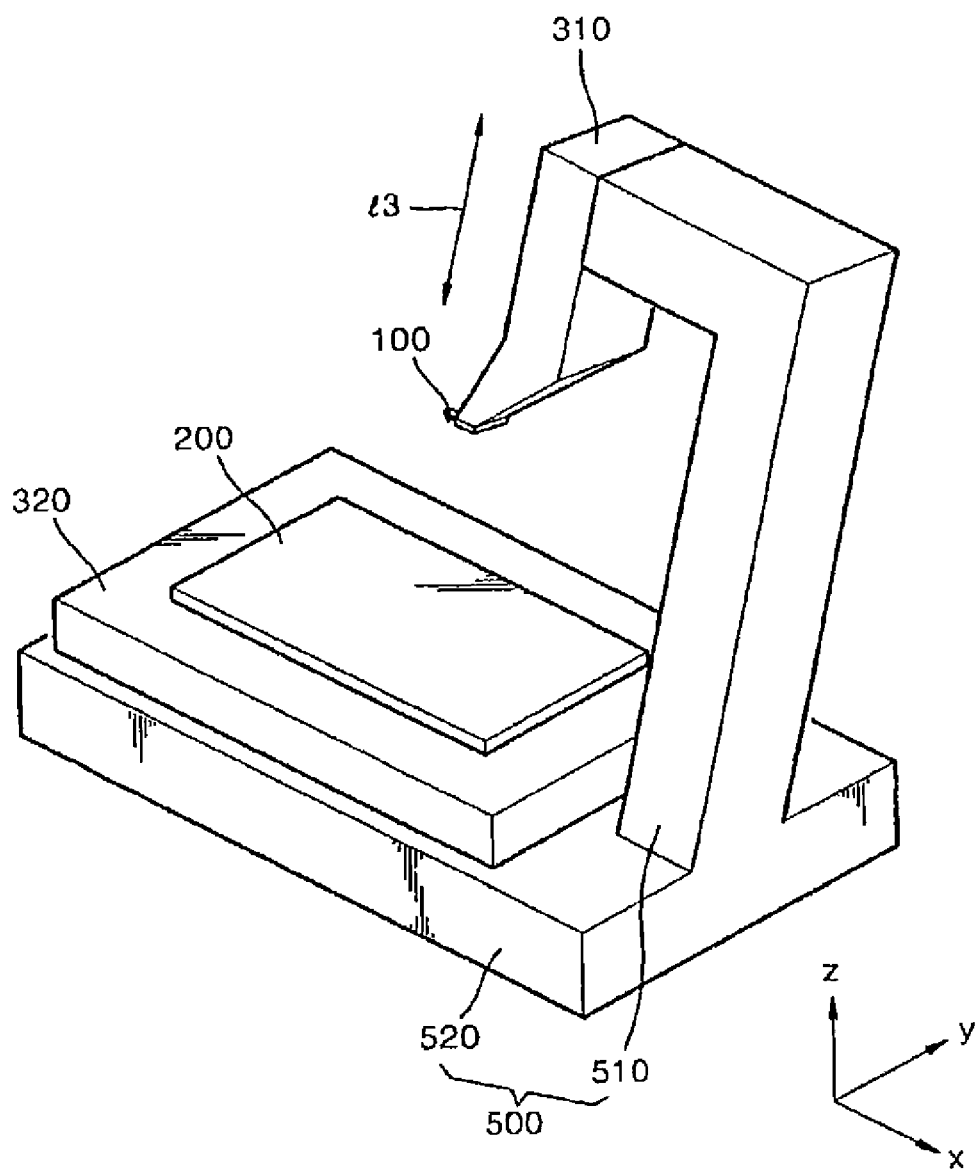
FIG. 10A is a schematic perspective view of a scanning probe microscope according to another embodiment of the present invention.
Figure 10B:
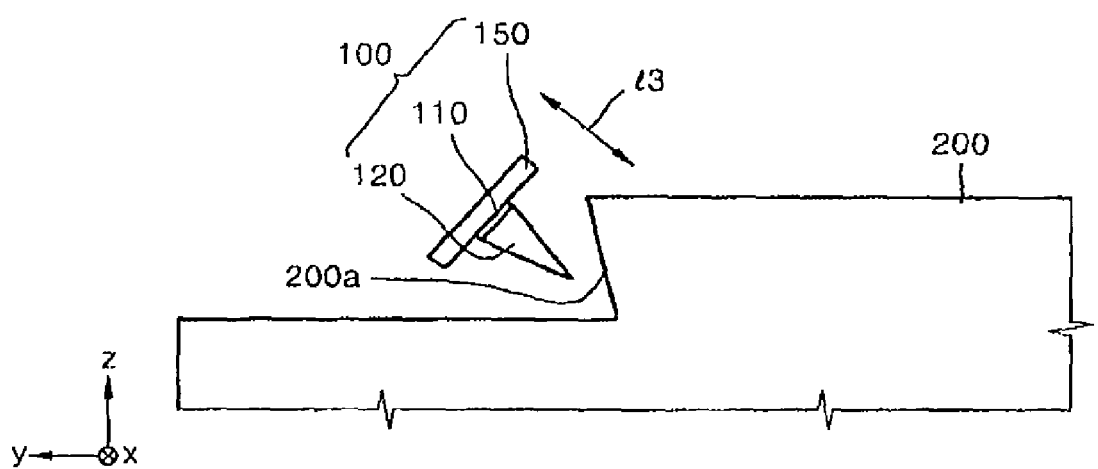
FIG. 10B is a schematic conceptual view for the case of analyzing a sample using the scanning probe microscope of FIG. 10A.

Meanwhile, in FIGS. 5, 7, 8, and 9, the straight line I2 in which the position of the first probe 100 is changed using the first scanner 310 of the scanning probe microscope is inclined in an-x-axis direction based on a coordinate system illustrated in each drawing of FIGS. 5, 7, 8, and 9 with respect to a straight line I1 in which the position of the probe 10 is changed using the first scanner 31 in the conventional scanning probe microscope illustrated in FIG. 1. However, the scanning probe microscope according to the present invention is not limited to this. That is, like a scanning probe microscope illustrated in FIGS. 10A and 10B according to another embodiment of the present invention, a straight line I3 in which the position of the first probe 100 is changed using the first scanner 310 may also be inclined in a y-axis direction based on the coordinate system illustrated in each drawing of FIGS. 5, 7, 8, 9, and 10A, with respect to the straight line I1 in which the position of the probe 10 is changed using the first scanner 31 in the conventional scanning probe microscope illustrated in FIG. 1. That is, the scanning probe microscope according to the present invention is sufficient that the straight line along which the position of the first probe is changed using the first scanner is non-perpendicular to the plane in which the position of the sample is changed using the second scanner. Alternatively, the scanning probe microscope according to the present invention is sufficient that an angle formed between the straight line along which the position of the first probe is changed using the first scanner and the plane in which the position of the sample is changed using the second scanner may be changed by the first actuator.

Figure 11:
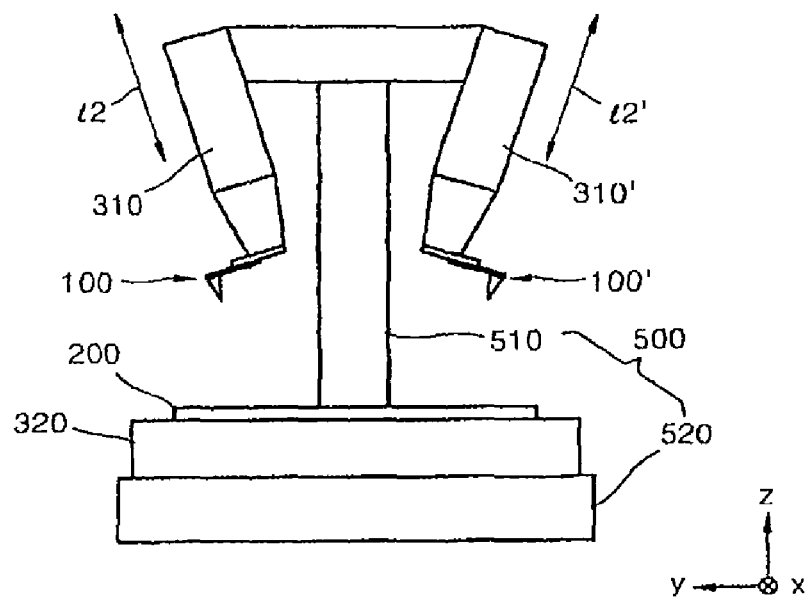
FIG. 11 is a schematic side view of a scanning probe microscope according to another embodiment of the present invention.

FIG. 11 is a schematic side view of a scanning probe microscope according to another embodiment of the present invention.

The scanning probe microscopes according to the above-described embodiments of FIGS. 5, 7, 8, 9, and 10A, a probe is one and the probe moves in a straight line using the first scanner. However, the scanning probe microscope illustrated in FIG. 11 further includes a second probe 100' except for the first probe 310. And, the scanning probe microscope of FIG. 11 includes a third scanner 310', and the third scanner 310' changes the position of the second probe 100' in a straight line I2' that is different from a straight line I2 in which the position of the first probe 100 is changed using the first scanner 310. Of course, the straight line I2' in which the position of the second probe 100' is changed using the third scanner 310' is non-perpendicular to the plane (the xy-plane) in which the position of the sample 200 is changed using the second scanner 320. In this case, the straight line I2 in which the position of the first probe 100 is changed using the first scanner 310 is changed and the straight line I2' in which the position of the second probe 100' is changed using the third scanner 310' are on the same plane.

As described previously with reference to FIGS. 6A, 6B, and 6C, a position relationship between a direction where the side surface of the sample in the overhang shape of the sample is inclined and a straight line where the position of the probe is changed should be decided so that correct data related to the sample can be obtained. Thus, as illustrated in FIG. 11, the scanning probe microscope includes the first probe 100 and the second probe 100' and the straight line I2 in which the position of the first probe 100 is changed using the first scanner 310' and the straight line I2' in which the position of the second probe 100' is changed using the third scanner 310' are different from each other so that correct data related to side surfaces inclined in various directions in the overhang shape of the sample 200 can be obtained without rotating the sample 200.

Figure 12:
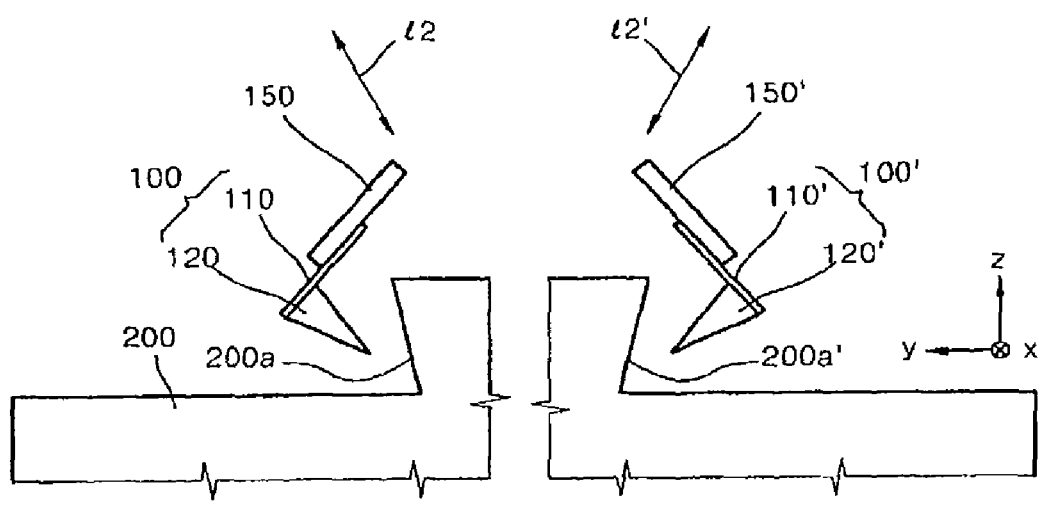
FIG. 12 is a schematic conceptual view for the case of analyzing a sample using the scanning probe microprobe of FIG. 11.

FIG. 12 is a schematic conceptual view for the case of analyzing a sample 200 using the scanning probe microscope of FIG. 11. It can be understood that correct data related to differently-inclined side surfaces 200a and 200a' can be obtained.

Of course, such a modification is not limited to the scanning probe microscope illustrated in FIG. 11. That is, as described in the above-described embodiments of FIGS. 5, 7, 8, 9, 10A, and 11, the scanning probe microscope of FIG. 12 may include a first actuator for moving a first scanner 310 and further include a second actuator for moving a third scanner 310'. In addition, of course, various modifications like that the first scanner 310 may be supported by a first frame, the third scanner 310' may be supported by a third frame, the first actuator may move the first frame for supporting the first scanner, and the second actuator may move the third frame for supporting the third scanner, are possible.

By using the scanning probe microscope according to the above-described embodiments of FIGS. 5, 7, 8, 9, 10A, and 11, even though a sample has an overhang structure, a tip of a probe can precisely scan a side surface of the sample having the overhang structure such that correct data related to the surface of the sample are collected. In addition, components including a tip that has been used in the conventional scanning probe microscope can also be used without any changes such that a high-performance scanning probe microscope is manufactured with the same yield without an increase in manufacturing costs.

As described above, according to the scanning probe microscope according to the present invention, characteristics of samples having an overhang structure can be precisely and correctly analyzed.

Figure 13:
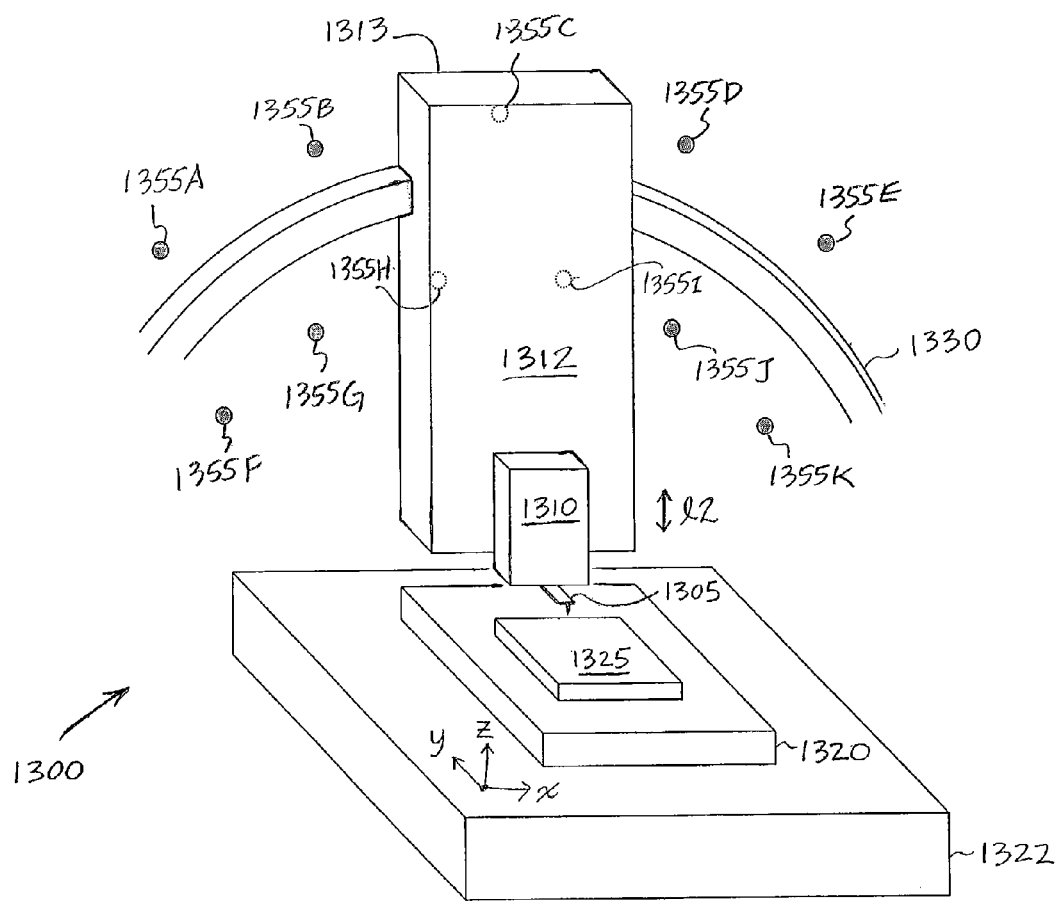
FIG. 13 is a schematic perspective view of a scanning probe microscope according to another embodiment of the present invention.

FIG. 13 is a schematic perspective view of a scanning probe microscope 1300 according to another embodiment of the present invention. The scanning probe microscope 1300 includes a probe 1305, a first scanner 1310 attached to a movable assembly 1312, and a second scanner 1320 attached to a base 1322. The first scanner 1310 changes the position of the probe 1305 along a straight line I2, and the second scanner 1320 changes the position of a sample 1325 in a plane (e.g., an xy-plane or horizontal plane). In FIG. 13, the straight line I2 along which the position of the probe 1305 is changed using the first scanner 1310 is perpendicular to the plane in which the position of the sample 1325 is changed using the second scanner 1320. FIGS. 14A-14D show other scanning positions of the first scanner 1310. In these other scanning positions, the first scanner 1310 changes the position of the probe 1305 along a straight line I2 which is not perpendicular to the plane in which the position of the sample 1325 is changed using the second scanner 1320.

Figure 14A:
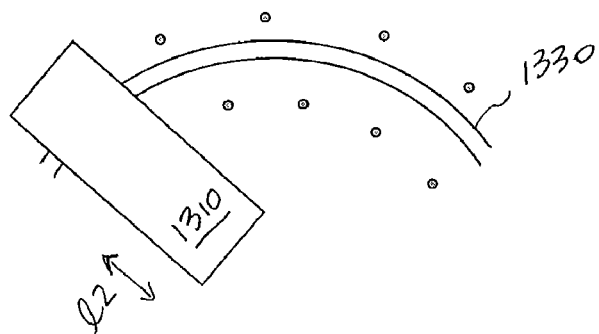
FIGS. 14A-14D illustrate four different positions to which the movable assembly can be moved to tilt the probe scanning direction with respect to the vertical direction.
Figure 14B:
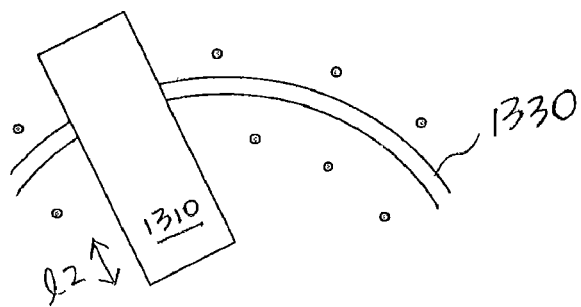
Figure 14C:
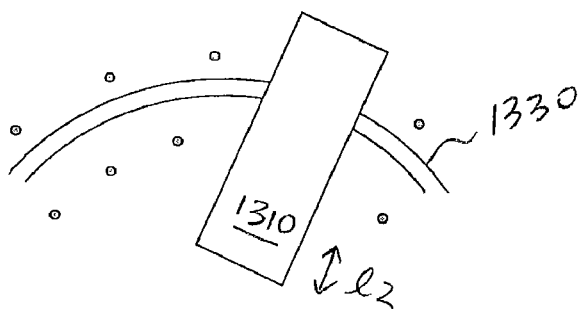
Figure 14D:
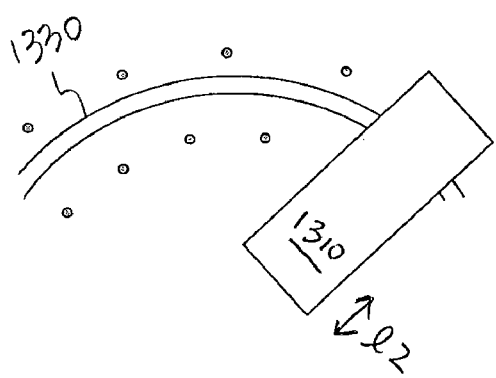

In the scanning positions shown in FIGS. 14A and 14D, the straight line I2 forms a 52-degree angle with the plane in which the position of the sample 1325 is changed using the second scanner 1320. In the scanning positions shown in FIGS. 14B and 14C, the straight line I2 forms a 71-degree angle with the plane in which the position of the sample 1325 is changed using the second scanner 1320. The scanning direction of the first scanner 1310 having the scanning position shown in FIG. 14A and the scanning direction of the first scanner 1310 having the scanning position shown in FIG. 14D are symmetrical with respect to a vertical plane. Similarly, the scanning direction of the first scanner 1310 having the scanning position shown in FIG. 14B and the scanning direction of the first scanner 1310 having the scanning position shown in FIG. 14C are symmetrical with respect to a vertical plane.

The first scanner 1310 attains the different scanning positions shown in FIG. 13 and FIGS. 14A-14D when the movable assembly 1312 is moved along a curved guide 1330 to one of five different positions along the curved guide 1330 and is engaged with hemispherical projections 1355A-K (collectively referred to as 1355) formed on a stationary frame 1350, as further described below. For simplicity, the drive mechanism for the movable assembly 1312 is not shown in any of the figures. Any drive mechanism known in the art that is capable of moving the movable assembly 1312 along the curved guide 1330 may be used. In addition, to minimize the variance of the probe position with respect to the sample 1325 as the movable assembly 1312 is moved along the curved guide 1330, the probe 1305 is mounted at or near the center point of a rotational arc that is defined by the movement of the movable assembly 1312 along the curved guide 1330.

Figure 15:
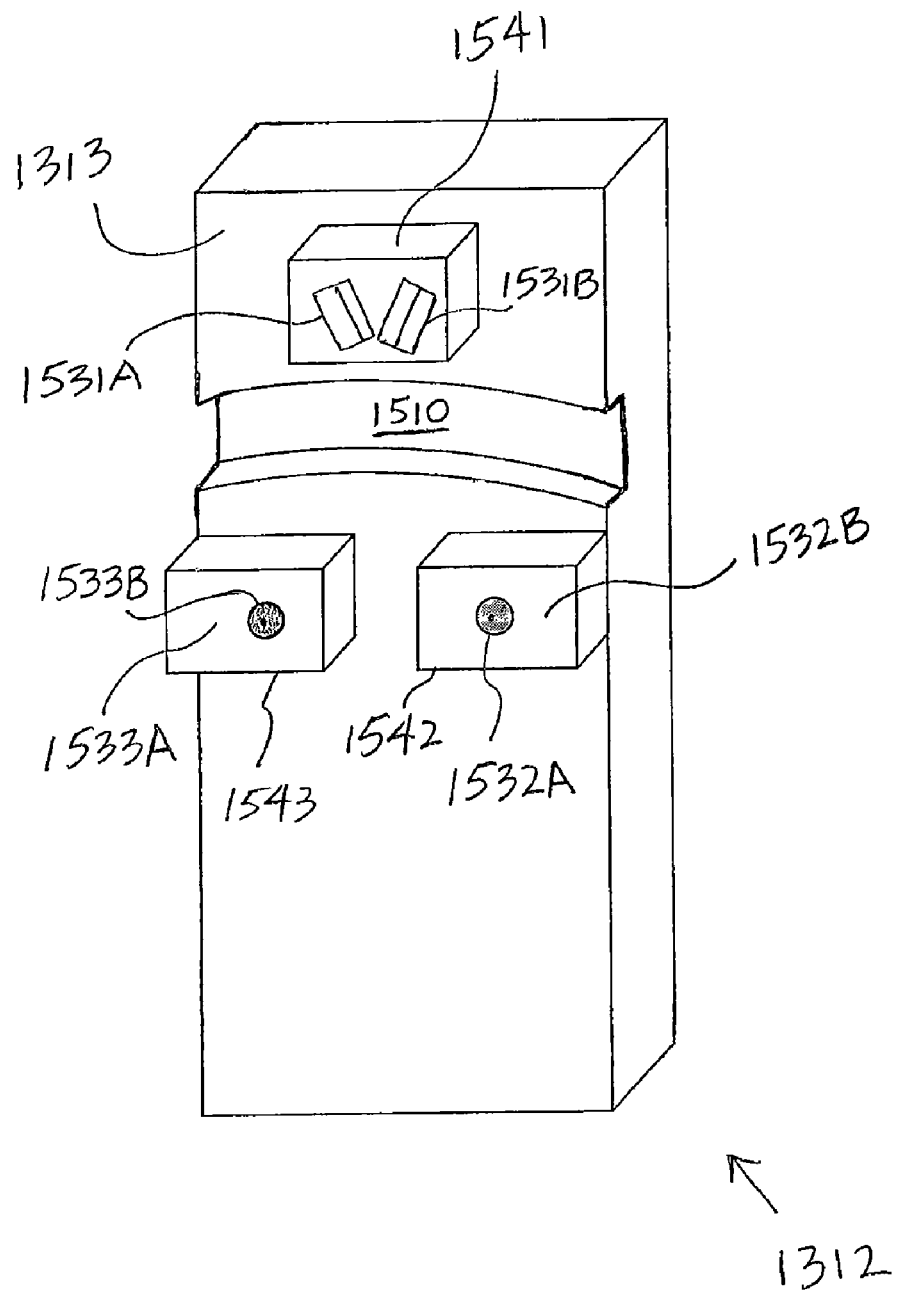
FIG. 15 is a schematic perspective view of the rear of the movable assembly.

FIG. 15 is a schematic perspective view of the rear of the movable assembly 1312 and shows a curved slot 1510 by which the movable assembly 1312 rides along the curved guide 1330. After the movable assembly 1312 is moved to a desired position, it is maintained at that position with respect to the stationary frame 1350 by two means. The first is a vacuum (or alternatively, a magnetic force) applied between a rear surface 1313 of the movable assembly 1312 and the curved guide 1330. The second is the engagement of: (1) v-groove 1531A or 1531B formed on extension arm 1541 of the movable assembly 1312 with a corresponding hemispherical projection 1355 formed on the stationary frame 1350, and (2) conic groove 1532A formed on extension arm 1542 of the movable assembly 1312 or conic groove 1533B formed on extension arm 1543 of the movable assembly 1312 with a corresponding hemispherical projection 1355 formed on the stationary frame 1350. A flat surface 1533A or 1532B formed on extension arm 1543 also contacts a corresponding hemispherical projection 1355 formed on the stationary frame 1350.

Before the movable assembly 1312 is moved between positions, the vacuum (or magnetic force) applied between the movable assembly 1312 and the curved guide 1330 is released. Then, the movable assembly 1312 is driven to a new position and the vacuum (or magnetic force) is reapplied between the movable assembly 1312 and the curved guide 1330. When the vacuum (or magnetic force) is reapplied between the movable assembly 1312 and the curved guide 1330, the grooves 1531A (or 1531B) and 1532A (or 1533B) engage with their corresponding hemispherical projections 1355 and compensate for any small positioning errors. As a result, precise angular tilt of the scanning direction of the first scanner 1310 can be achieved with high repeatability.

The table below shows, for each of the different scanning positions of the first scanner 1310: (1) the angle formed between scanning direction of the first scanner 1310 and the plane in which the position of the sample 1325 is changed using the second scanner 1320, (2) the points on the movable assembly 1312 that contact the hemispheric projections 1355 formed on the stationary frame 1350, and (3) the hemispheric projections 1355 formed on the stationary frame 1350 that are engaged with or otherwise contact the movable assembly 1312.

| Position | Angle | Contact 1 | Contact 2 | Contact 3 |
|---|---|---|---|---|
| 1 | 52.0 | groove 1531A with projection 1355A | groove 1532A with projection 1355F | flat surface 1533A with projection 1355G |
| 2 | 71.0 | groove 1531A with projection 1355B | groove 1532A with projection 1355G | flat surface 1533A With projection 1355H |
| 3 | 90.0 | groove 1531A with projection 1355C | groove 1532A with projection 1355H | flat surface 1533A with projection 1355I |
| 4 | 71.0 | groove 1531B with projection 1355D | flat surface 1532B with projection 1355I | groove 1533B with projection 1355J |

| Position | Angle | Contact 1 | Contact 2 | Contact 3 |
|---|---|---|---|---|
| 5 | 52.0 | groove 1531B with projection 1355E | flat surface 1532B with projection 1355J | groove 1533B with projection 1355K |

Figure 16:
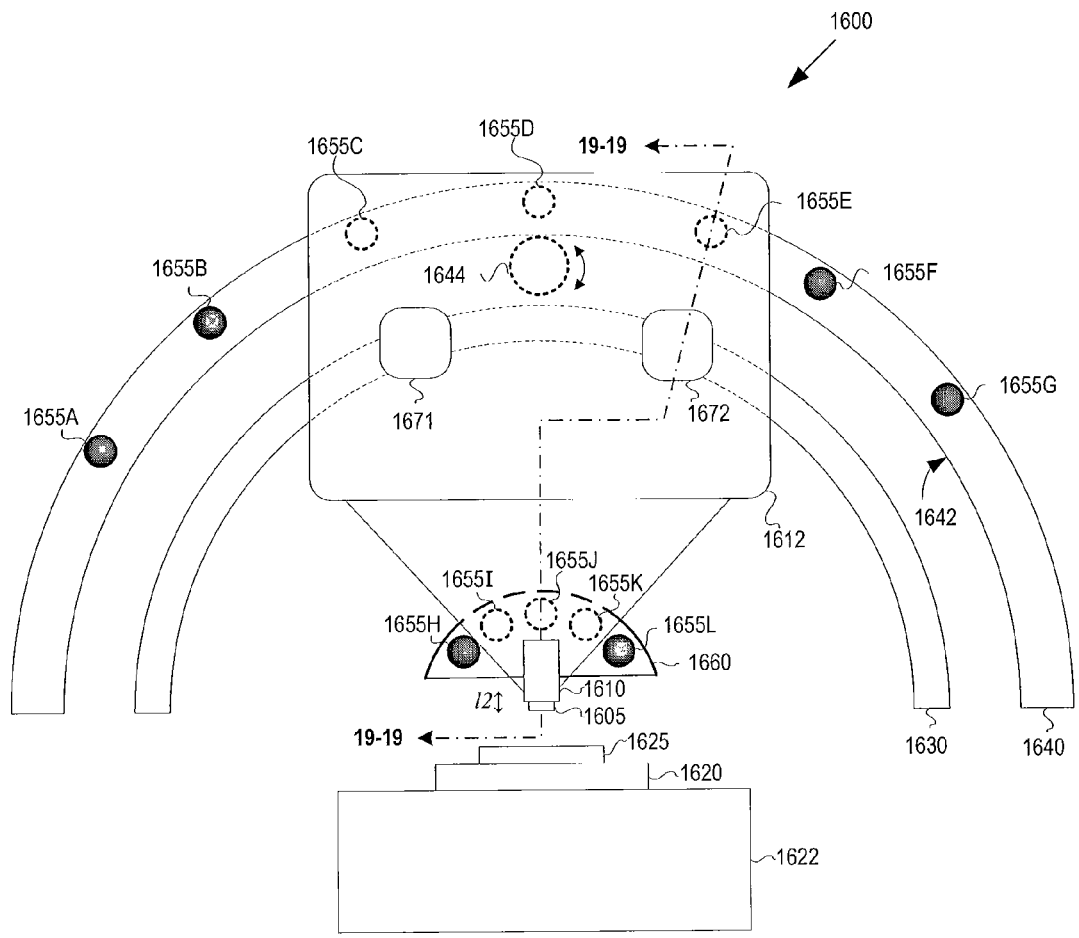
FIG. 16 is a schematic perspective view of a scanning probe microscope according to yet another embodiment of the present invention.

FIG. 16 is a plan view of a scanning probe microscope 1600 according to yet another embodiment of the present invention. The scanning probe microscope 1600 includes a probe 1605, a first scanner 1610 attached to a movable assembly 1612, and a second scanner 1620 attached to a base 1622. The first scanner 1610 changes the position of the probe 1605 along a straight line I2, and the second scanner 1620 changes the position of a sample 1625 in the plane of the sample (e.g., an xy-plane or horizontal plane). In FIG. 16, the straight line I2 along which the position of the probe 1605 is changed using the first scanner 1610 is perpendicular to the sample plane. The straight line I2 can form non-perpendicular angles with respect to the sample plane by moving the movable assembly 1612 along an inner curved guide 1630 and thereby tilting the scanning direction of the first scanner 1610 with respect to the sample plane. The tilted scanning directions of the first scanner 1610 are shown in FIGS. 17A-17D.

The first scanner 1610 attains the different scanning positions shown in FIG. 16 and FIGS. 17A-17D when the movable assembly 1612 is moved along the inner curved guide 1630 to one of five different positions along the inner curved guide 1630 and is engaged with hemispherical projections 1655A-G formed on an outer curved guide 1640 and hemispherical projections 1655H-L formed on a plate 1660, as further described below. The hemispherical projections 1655A-L are collectively referred to as 1655. In one embodiment, hemispheric projections are ceramic balls, which provide increased resistance to deformation and wear. The drive system for the movable assembly 1612 is a rack-and-pinion drive system. The rack gear of this drive system, indicated as 1642, is formed along the inner periphery of the outer curved guide 1640. The pinion gear of this drive system, shown schematically as a dashed circle 1644, is mounted on the movable assembly 1612 for movement with the movable assembly 1612. When the pinion gear 1644 is engaged with the rack gear 1642 and rotates, the movable assembly 1612 is moved along the inner curved guide 1630. To minimize the variance of the probe position with respect to the sample 1625 as the movable assembly 1612 is moved along the inner curved guide 1630, the probe 1605 is mounted at or near the center point of a rotational arc that is defined by the movement of the movable assembly 1612 along the inner curved guide 1630.

After the movable assembly 1612 is moved to a desired position, it is maintained at that position by way of a kinematic mount and a spring force. The kinematic mount includes two of the hemispherical projections 1655A-G formed on the outer curved guide 1640 that contact and engage with corresponding groove and surface on the rear of the movable assembly 1612 and one of the hemispherical projections 1655H-L formed on the plate 1660 that contacts and engages with a corresponding groove on the rear of the movable assembly 1612. The spring force urges the rear of the movable assembly 1612 against the hemispherical projections to keep the movable assembly 1612 coupled to the hemispherical projections by way of the kinematic mount.

Figure 18:
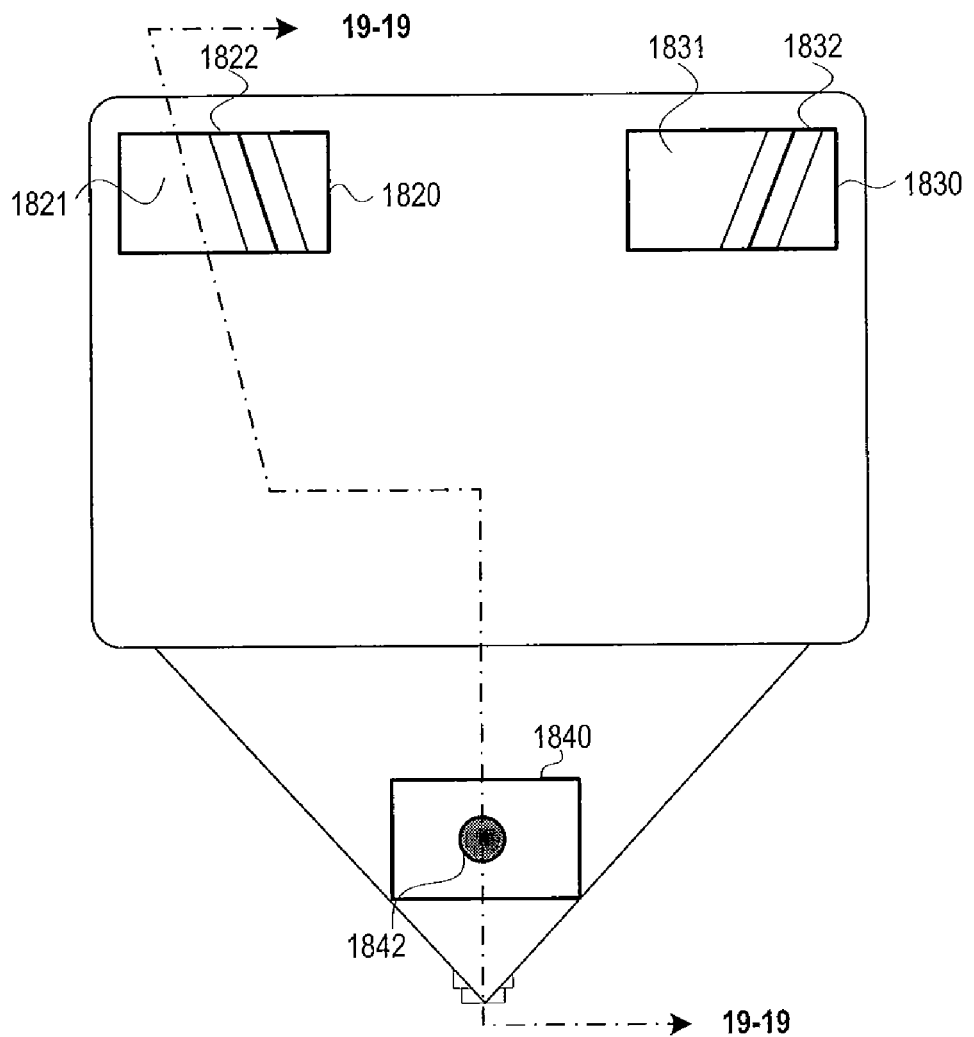
FIG. 18 is a simplified rear plan view of the movable assembly shown in FIG. 16.

FIG. 18 is a simplified rear plan view of the movable assembly 1612 and shows the grooves and surfaces of the movable assembly 1612 that contact the hemispherical projections 1655. The contact points include a flat surface 1821 and a V-groove 1822 formed on a first block 1820, a flat surface 1831 and a V-groove 1832 formed on a second block 1830, and a cone groove 1842 formed on a third block 1840. The table below shows, for each of the different scanning positions of the first scanner 1610: (1) the angle formed between scanning direction of the first scanner 1610 and the sample plane, and (2) the points on the movable assembly 1612 that are in contact with the hemispheric projections 1655.

Figure 17A:
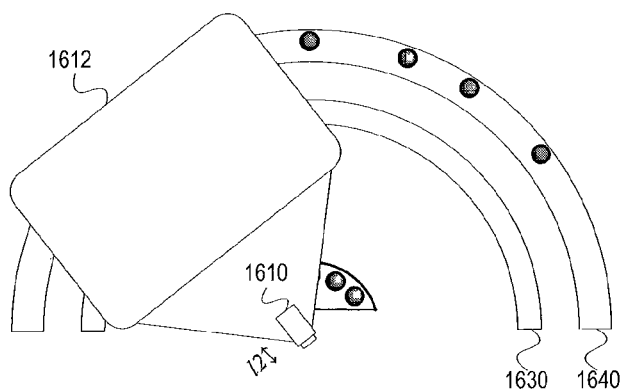
FIGS. 17A-17D illustrate four different positions to which the movable assembly shown in FIG. 16 can be moved to tilt the probe scanning direction with respect to the vertical direction.
Figure 17B:
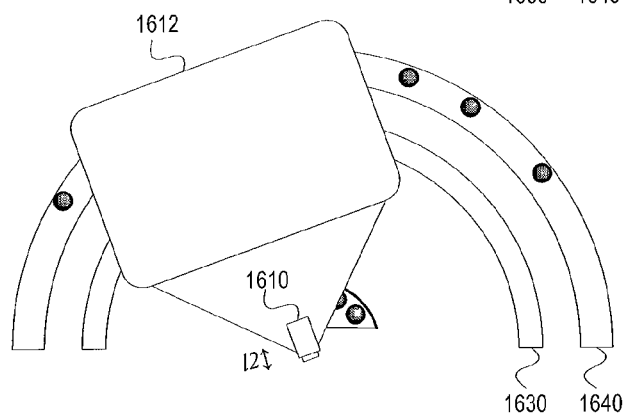
Figure 17C:
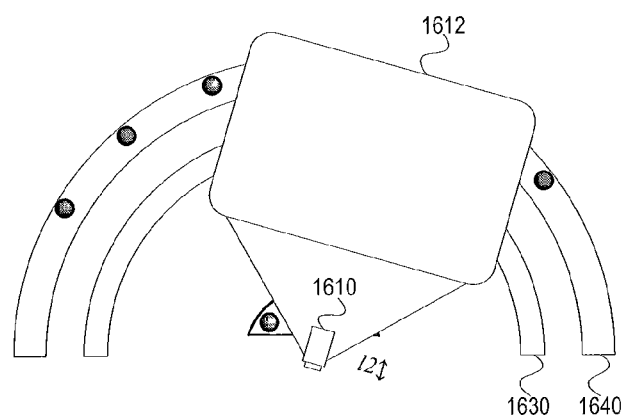
Figure 17D:
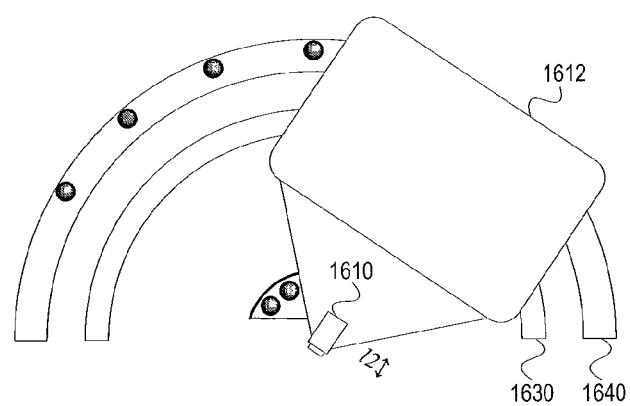

| Position | Angle | Contact 1 | Contact 2 | Contact 3 |
|---|---|---|---|---|
| 1 FIG. 17A | 52.0 | V-groove 1832 with projection 1655A | flat surface 1821 with projection 1655C | cone groove 1842 with projection 1655H |
| 2 FIG. 17B | 71.0 | V-groove 1832 with projection 1655B | flat surface 1821 with projection 1655D | cone groove 1842 with projection 1655I |
| 3 FIG. 16 | 90.0 | V-groove 1832 with projection 1655C | flat surface 1821 with projection 1655E | cone groove 1842 with projection 1655J |
| 4 FIG. 17C | 71.0 | flat surface 1831 with projection 1655D | V-groove 1822 with projection 1655F | cone groove 1842 with projection 1655K |
| 5 FIG. 17D | 52.0 | flat surface 1831 with projection 1655E | V-groove 1822 with projection 1655G | cone groove 1842 with projection 1655L |

Figure 19A:
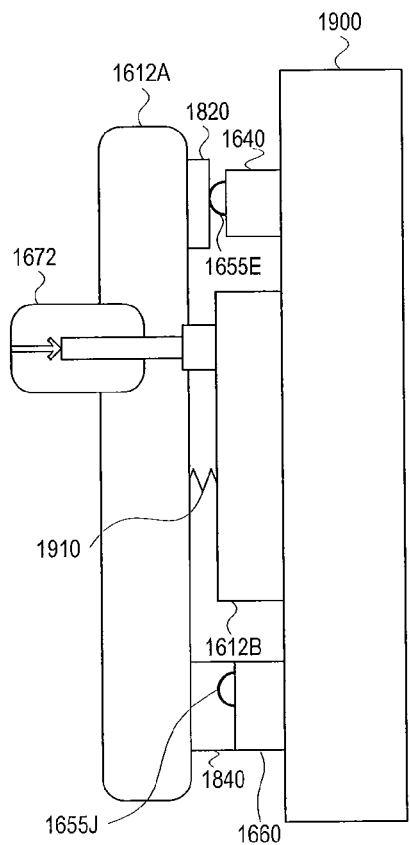
FIGS. 19A and 19B are simplified cross-sectional views of the scanning probe microscope shown in FIG. 16 and illustrate the engagement and disengagement of the movable assembly with and from projections formed on a stationary frame.
Figure 19B:
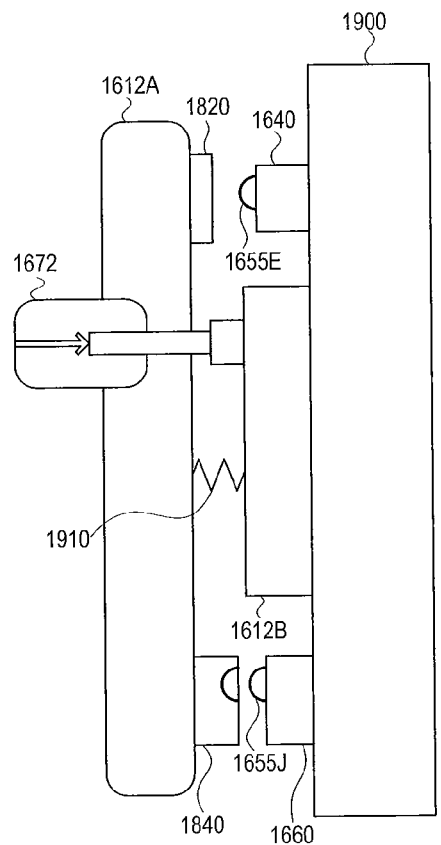

The first block 1820, the second block 1830, and the third block 1840 extend away from the rear surface of movable assembly 1612. FIGS. 19A and 19B, which are simplified cross-sectional views of the scanning probe microscope shown in FIG. 16, illustrates the extension for the first block 1820 and the third block 1840. The second block 1830 extends from the rear surface of movable assembly 1612 in the same manner. Likewise, the outer curved guide 1640 and the plate 1660 extend away from a front surface of a stationary frame 1900.

In FIGS. 19A and 19B, the inner curved guide 1630 is hidden from view by an inner curved guide engaging member 1612B, which is part of the movable assembly 1612. The inner curved guide engaging member 1612B is mechanically linked to a head portion 1612A of the movable assembly 1612 and moves in unison with the head portion 1612A in the plane of the curved guide 1630. Thus, as the inner curved guide engaging member 1612B is moved in the plane of the curved guide 1630, the head portion 1612A is moved also. The head portion 1612A is, however, free to move relative to the inner curved guide engaging member 1612B in a direction that is out of the plane of the curved guide 1630, e.g., perpendicular to the plane of the curved guide 1630, and a spring force represented schematically in FIGS. 19A and 19B as 1910 urges the head portion 1612A and the inner curved guide engaging member 1612B together. When the movable assembly 1612 attains one of the five positions shown in FIGS. 16 and 17A-17D, the spring force 1910 keeps the three contact points of the movable assembly 1612 coupled to the hemispherical projections by way of a kinematic mount. In one embodiment, the spring force 1910 is produced by three separate coil springs, one end of which is attached to the head portion 1612A and the other end of which is attached to the inner curved guide engaging member 1612B. The coil springs are well spaced and are arranged in a triangular form on the head portion 1612A and the inner curved guide engaging member 1612B so that they are approximately equidistant from one another.

When it is desired to move the movable assembly 1612 to a new position, air pressure is applied to a pair of pneumatic actuators 1671, 1672. The application of the air pressure causes the pneumatic actuators 1671, 1672 to press against the inner curved guide engaging member 1612B. As a consequence, the head portion 1612A moves away from the inner curved guide engaging member 1612B, and the three contact points of the movable assembly 1612 become disengaged from the hemispherical projections, as shown in FIG. 19B. The movable assembly 1612 is then driven to a desired position by rotation of the pinion gear 1644. When the desired position is reached, the air pressure to the pneumatic actuators 1671, 1672 is removed to cause the three contact points of the movable assembly 1612 to be coupled to the hemispherical projections by way of a kinematic mount.

Without departing from the scope of the invention, the number of predefined positions to which the movable assembly 1312/1612 can be moved can be more or less than 5. If there is less than 5, a smaller number of hemispheric projections 1355/1655 will be needed. If there are more than 5, a greater number of hemispheric projections 1355/1655 will be needed. In addition, the location of the hemispheric projections 1355/1655 on the stationary frame 1350/1900 may be changed in other embodiments to alter by any desired amount the scanning direction of the first scanner 1310/1610 (and so the angle formed between the scanning direction of the first scanner 1310/1610 and the plane in which the position of the sample 1325/1625), when the movable assembly 1312/1612 moves into position and engages with the hemispheric projections 1355/1655 at a modified location.

In one alternative embodiment, the number of predefined positions to which the movable assembly 1312/1612 can be moved is 3, and the angles formed between the scanning direction of the first scanner 1310/1610 and the plane in which the position of the sample 1325/1625, when the movable assembly 1312/1612 moves into the predefined positions, are 90 degrees and +/−50 degrees.

While the foregoing is directed to embodiments of the present invention, other and further embodiments of the invention may be devised without departing from the basic scope thereof, and the scope thereof is determined by the claims that follow.

We claim:

1. A scanning probe microscope comprising:
   a probe head including a probe and a first scanner for changing a position of the probe along a straight line;
   a drive system for moving the probe head to position the first scanner in one of multiple scanning positions; and
   a second scanner for changing a position of a sample in a plane,
   wherein, for each of the scanning positions, the straight line along which the first scanner changes the position of the probe forms a different angle with respect to the plane in which the position of the sample is changed using the second scanner.

2. The scanning probe microscope of claim 1, wherein the drive system comprises a rack-and-pinion drive system.

3. The scanning probe microscope of claim 1, wherein the probe head includes grooves for engaging corresponding projections on a stationary frame.

4. The scanning probe microscope of claim 3, wherein the probe head includes a spring that urges the grooves against the corresponding projections.

5. The scanning probe microscope of claim 4, wherein the probe head includes a pneumatic actuator, which when actuated applies a force in a direction opposite to that of the spring and causes the grooves to be disengaged from the corresponding projections.

6. The scanning probe microscope of claim 3, wherein the corresponding projections are ceramic balls.

7. The scanning probe microscope of claim 3, wherein the probe head includes a V-groove for engaging one of the projections on the stationary frame and a conic groove for engaging another one of the projections on the stationary frame.

8. The scanning probe microscope of claim 7, wherein the probe head further includes a flat surface for contacting a third projection on the stationary frame.

9. A positioning system for a probe of a scanning probe microscope comprising:
   a stationary frame with an outer curved guide, an inner curved guide, and projections;
   a movable assembly having an inner curved guide engaging member and a probe head including a scanner and grooves for engaging corresponding projections of the stationary frame; and
   a drive system for the movable assembly, the drive system including a pinion gear that engages with a rack gear formed along an inner periphery of the outer curved guide,
   wherein a scanning direction of the scanner changes as the movable assembly is moved along the inner curved guide.

10. The positioning system of claim 9, wherein the movable assembly includes a plurality of springs that urge the probe head toward the projections.

11. The positioning system of claim 10, wherein the movable assembly includes a pneumatic actuator, which when actuated applies a force in a direction opposite to the force of the springs and causes the probe head to move away from the projections.

12. The positioning system of claim 9, wherein the grooves include a V-groove for engaging one of the projections that are disposed on the stationary frame on a first side of the inner curved guide and a conic groove for engaging one of the projections that are disposed on the stationary frame on a second side of the inner curved guide that is opposite the first side.

13. The positioning system of claim 12, wherein the projections that are disposed on the stationary frame on the first side of the inner curved guide are formed on the outer curved guide.

14. The positioning system of claim 9, wherein the projections are ceramic balls.

* * * * *